(12) United States Patent
Viola

(10) Patent No.: US 6,601,538 B1
(45) Date of Patent: Aug. 5, 2003

(54) COILED PET TOY

(76) Inventor: Charles A. Viola, 511 S. 2$^{nd}$ St., Fairfield, IA (US) 52556

( * ) Notice: Subject to any disclaimer, the term of this patent is extended or adjusted under 35 U.S.C. 154(b) by 38 days.

(21) Appl. No.: 10/163,133

(22) Filed: Jun. 4, 2002

(51) Int. Cl.$^7$ .............................................. A01K 29/00
(52) U.S. Cl. ...................................... 119/709; 119/707
(58) Field of Search ................................ 119/709, 702, 119/707–708, 710, 711; D30/160; 446/233, 234, 241, 269, 431; D28/39, 40, 41, 42

(56) References Cited

U.S. PATENT DOCUMENTS

| | | | |
|---|---|---|---|
| 1,673,538 A | * 6/1928 | Thuillier | 446/241 |
| D129,387 S | 9/1941 | McC. Beary | |
| 3,198,173 A | 8/1965 | Fisher | 119/29 |
| D234,789 S | 4/1975 | Rosenberg | D34/15 C |
| D234,790 S | 4/1975 | Rosenberg | D34/15 A |
| D236,148 S | 7/1975 | Rosenberg | D34/15 AG |
| D238,387 S | 1/1976 | Rosenberg | D34/15 C |
| D274,009 S | * 5/1984 | Caruso | D28/27 |
| D308,122 S | 5/1990 | Markham et al. | D30/160 |
| 4,957,300 A | 9/1990 | Storry | 273/428 |
| 5,269,256 A | 12/1993 | Viola | 119/707 |
| 5,653,593 A | * 8/1997 | Berlinski | 434/159 |
| D407,868 S | * 4/1999 | Axelrod | D30/160 |
| D408,482 S | * 4/1999 | Morrison | D21/708 |
| D411,042 S | * 6/1999 | Willinger | D30/160 |
| D460,222 S | * 7/2002 | DeRaspe-Bolles et al. | D30/160 |

* cited by examiner

Primary Examiner—Yvonne Abbott

(57) ABSTRACT

A new toy 10 for pets comprising a plurality of strips 12 each terminating in an end 16 that may be grabbed or bitten by the pet. The strips 12 are connected to a common junction 14 in such a manner that said strips 12 extend alternately from said junction 14 in opposite directions with some space in between the strips. All the strips 12 are convoluted or coiled about a common circular path. The common circular path forms a complete circle so that the toy 10 may roll freely with the coiled strips 12 in contact with the floor or other smooth surface upon which the toy 10 is used. The coiled strips 12 form a circular opening into which the pet may insert its paw in order to flip, lift, or scoop up the toy.

1 Claim, 3 Drawing Sheets

FIG. 1
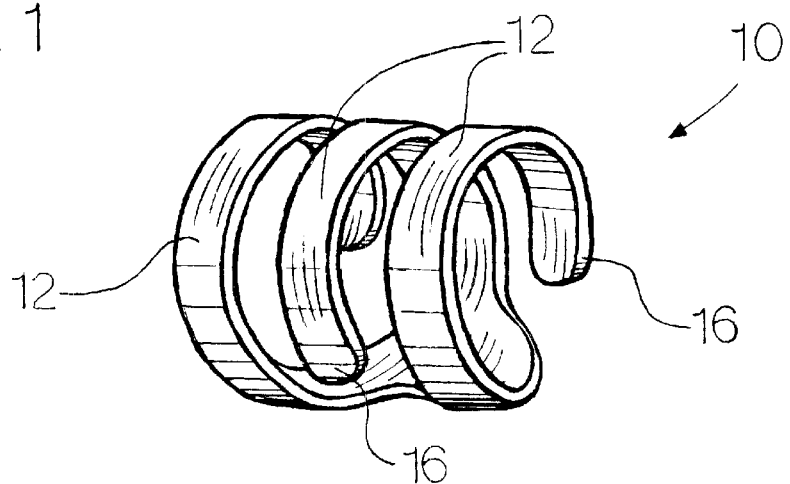
FIG. 2
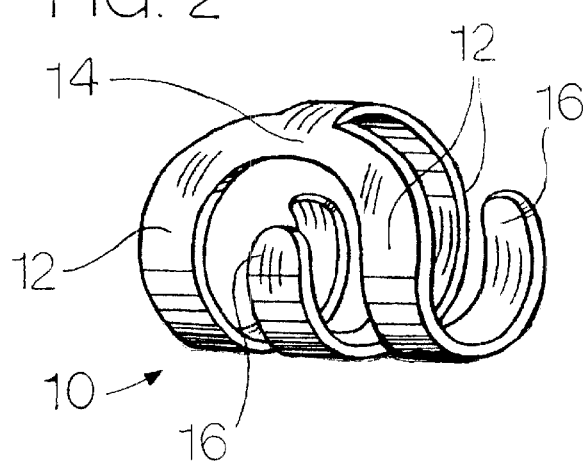
FIG. 3
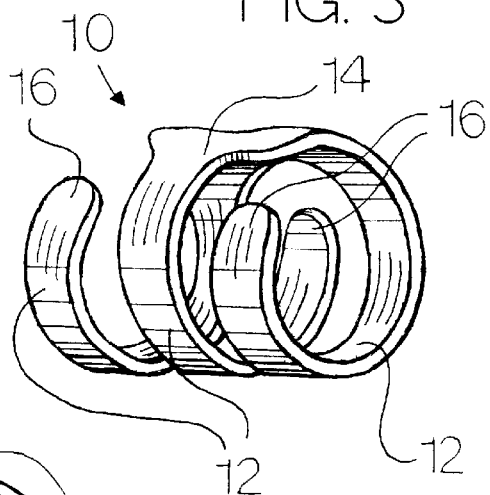
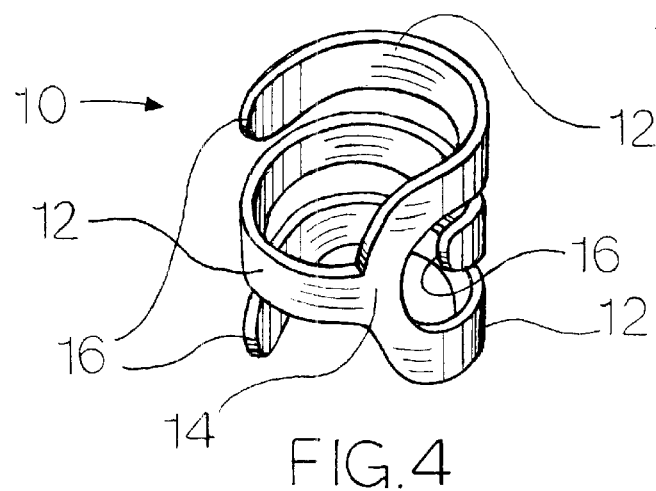
FIG. 4

COILED PET TOY

FIELD OF THE INVENTION

The disclosed invention is a novel toy that may be used by cats, dogs, ferrets, birds or any other pets that play with toys, though it is primarily intended for use by cats. The present invention relates to small toys that pets can bat and chase, bite, and carry in their mouths.

DESCRIPTION OF PRIOR ART

Pets such as cats, dogs, ferrets and birds are known to play with toys, providing amusement to themselves and their owners, as well as providing a form of exercise. These pets may display a variety of play patterns, including flipping, spinning, rolling or otherwise animating the toy by manipulating it with the paws or claws; batting the toy away and then chasing it; biting the toy; and carrying it around in the mouth. The more play patterns a toy can accommodate, the more useful it may be said to be.

U.S. Pat. Nos. D234,790, D234,789, and D236,148 to Rosenberg all show coiled pet toys that may be rolled easily, but lack protruding parts that may be easily bitten or grabbed by the pet. Also, they do not provide a means for the pet to scoop the toy up with its paw. U.S. Pat. No. D238,387 to Rosenberg shows a coiled pet toy that cannot be rolled or easily spun around by the pet.

U.S. Pat. No. 3,198,173 to Fisher teaches a coiled rawhide animal toy that can be rolled easily when in the configuration shown in FIG. 3 of his patent, but the two ends of the coiled strip are not easily grabbed by the mouth of a pet such as a cat. The invention disclosed herein has at least three strips with ends that can be easily bitten or grasped by the mouth of the pet, making it more useful for play than the invention of Fisher. Further, Fisher states in his patent that the use of rawhide is critical to his invention, while the presently disclosed invention may be made of colorful plastic and be manufactured inexpensively using the injection molding process thereby providing certain potential commercial advantages.

U.S. Pat. No. D308,122 to Markham et al. and U.S. Pat. No. D129,387 to McC. Beary both show a pet toy that may be easily rolled and might also be easily bitten or carried by a pet, but cannot be easily flipped, spun, or scooped up by a paw as can the presently disclosed invention.

U.S. Pat. No. 4,957,300 to Storry teaches a toy intended for humans comprising a coiled strip. The toy of Storry can be made to roll and spin easily, but because of its shape, it cannot be easily scooped up by the paw of a pet. It also lacks the convenient ends of the presently disclosed invention for the pet to bite or gnaw upon.

U.S. Pat. No. 5,269,256 to Viola teaches a ring shaped pet toy that accommodates a wide variety of play patterns, but does not roll or spin as easily as the invention disclosed herein.

SUMMARY

The invention disclosed herein comprises a plurality of strips, preferably made of resilient material such as flexible plastic. The strips have ends that may be easily bitten or gnawed upon by the pet. The strips all connect to a common junction and extend from that junction in alternately opposing directions with some space in between the strips.

The strips are coiled or curved about a common circular path, so that the toy may be rolled easily by the pet when the strips are in contact with a smooth surface.

OBJECTS AND ADVANTAGES

The present invention is a pet toy that provides a wide range of play possibilities not found in any single previous pet toy. It may be used for solo play when the pet is alone or for interactive play involving both the pet and owner together.

It may be easily made to roll by batting it with the paw in order to chase it. It may be rolled over smooth surfaces such as a tile or wooden floor or over rougher surfaces such as carpet or, in the case of a version that it is large enough for use by dogs, it may be rolled over grass or dirt. It may be rolled down stairs. It may be rolled by the animal or by the pet owner.

The toy may be made to spin or rotate around by manipulating it with the paw. Depending on the dexterity of the pet, the toy may also be made to tip over, tumble end-over-end, or flip. It may be tossed by the owner and caught in mid air by the pet either in the mouth or in the paws.

By inserting a paw into the opening within the circumference of the coiled strips, a pet may scoop up the toy in order to bring the toy to its mouth or to flip the toy into the air.

The ends of the strips may be bitten, gnawed, or chewed by the pet. The toy may also be easily grasped in the mouth of the pet and carried or dragged around thereby.

Other play possibilities than those mentioned above may be discovered over time as different pets and their owners play with the toy.

DRAWING FIGURES

FIG. 1 shows a perspective view of the invention.

FIG. 2 shows a perspective view of the invention, reversed from the position shown in FIG. 1 and rotated approximately 60 degrees therefrom.

FIG. 3 shows a perspective view of the invention rotated approximately 180 degrees from the position shown in FIG. 1.

FIG. 4 is a perspective view showing the invention standing on end.

REFERENCE NUMERALS IN DRAWINGS

Figure 5:
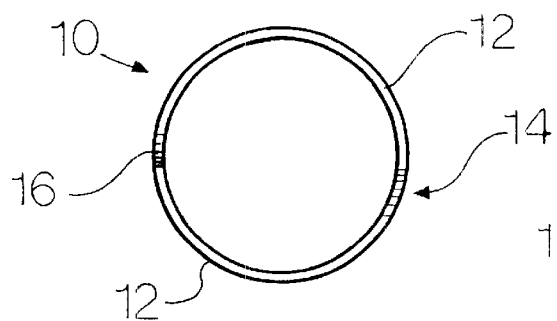
FIG. 5 shows an end elevation view of the invention.
Figure 6:
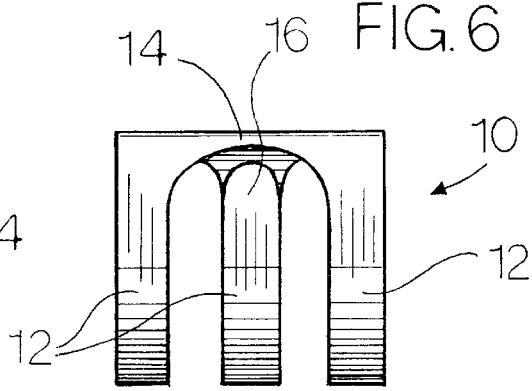
FIG. 6 shows a side elevation view of the invention.
Figure 7:
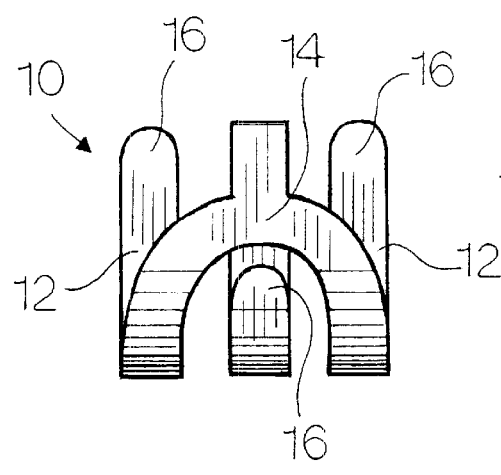
FIG. 7 shows a side elevation view of the invention rotated approximately 90 degrees from the view in FIG. 6.
Figure 8:
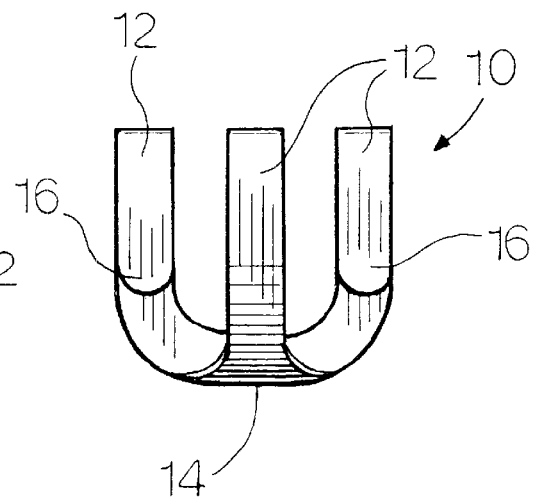
FIG. 8 shows a side elevation view of the invention rotated approximately 180 degrees from the view in FIG. 6.

10 Invention
12 Strip
14 Junction
16 End of strip
18 Playing surface
Operation

The present invention 10 is a toy intended for use by pets, especially cats. In the preferred embodiment, the toy 10 is made of a resilient, flexible material such as polyethylene plastic. The toy 10 has a plurality of strips 12 that are connected to a common junction 14. The toy 10 has at least three such strips 12. The strips 12 extend from the junction 14 in alternately opposing directions and have some space between them. Said strips 12 terminate in ends or tips 16 that can be easily bitten or grasped in the mouth of a pet.

The toy 10 may be batted about easily by the paws of the pet so that it may be chased and then captured, bitten, or carried in the mouth of the pet. Further, it may be rolled or thrown by the pet owner in order for the pet to chase or catch it.

Figures 10, 11:
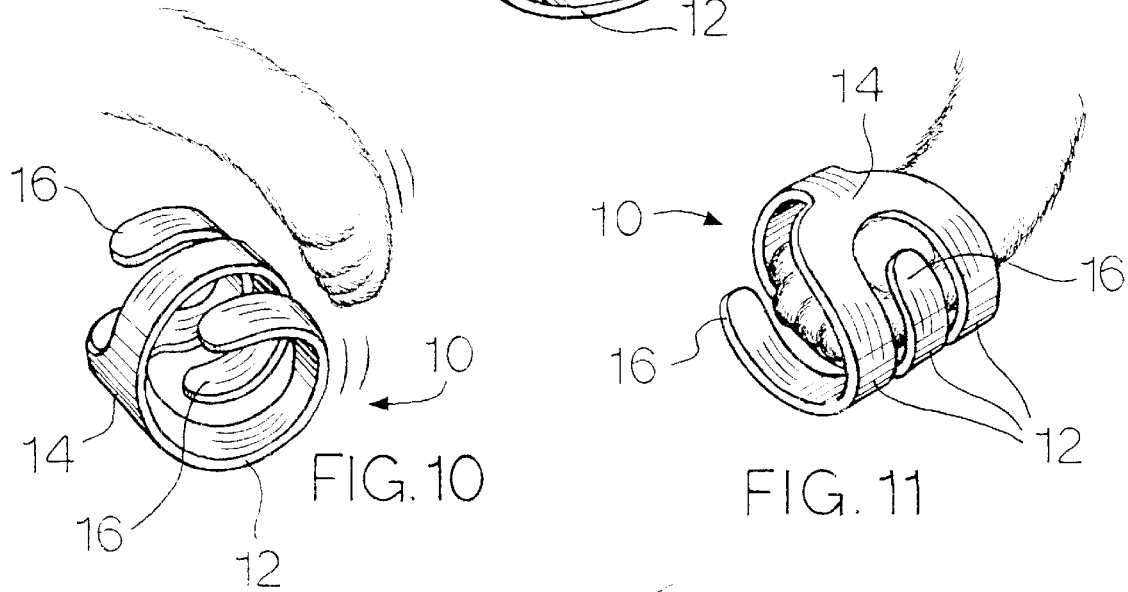
FIG. 10 shows the invention being pushed by the paw of a cat.
FIG. 11 shows the paw of a cat inserted into the invention.
Figure 12:
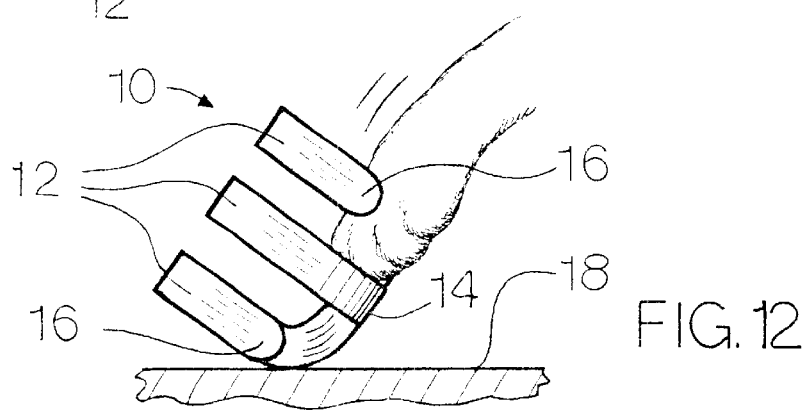
FIG. 12 shows a side elevation view of the invention as it is being tipped over by the paw of a cat, on a playing surface that is shown in cross-section.

When pushed or struck by the paw of a pet, the toy 10 may be caused to roll or spin on a playing surface 18 such as a floor. The toy 10 may be caused to tip over as shown in FIG. 12 or tumble end-over-end. The pet may insert part or all of its paw into the space surrounded by the strips 12 of the toy 10, as shown in FIG. 11, and lift, flip or scoop up the toy 10.

Figure 9:
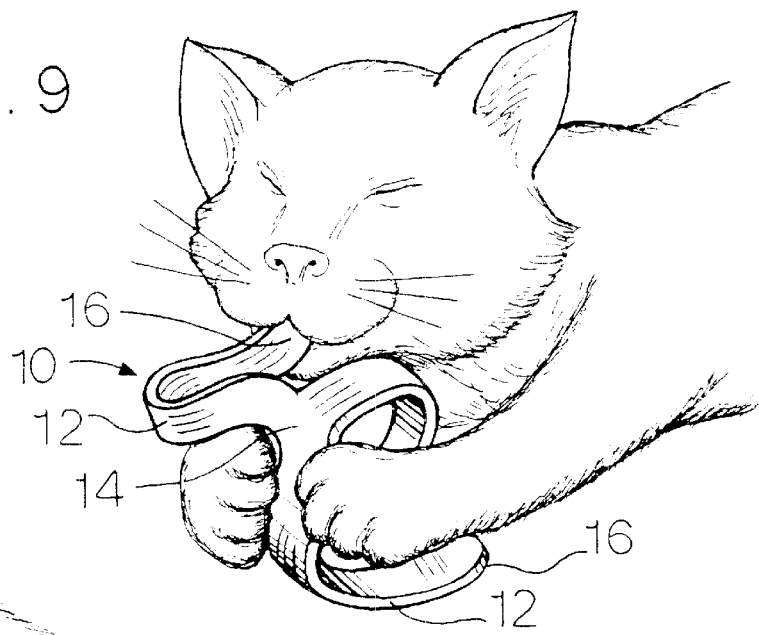
FIG. 9 shows the invention being bitten and deformed by a cat.

The ends 16 of the strips 12 may be grasped by the mouth of the animal and gnawed upon as shown in FIG. 9. The strips 12 may also be pushed or pulled by the pet, stretching or deforming the toy 10.

The toy 10 may also be dragged or carried in the mouth by the pet. Therefore it can be said that the toy 10 allows a wide variety of play possibilities.

In the preferred embodiment, the toy 10 is made of a resilient material allowing it to be easily deformed by the pet and yet allowing it to return to its former shape for further play. In addition, the resilient material allows the toy 10 to bounce, increasing its range of play possibilities. In the preferred embodiment, the toy has three strips 12 as shown in the drawings and a junction 14 that has rounded edges to it as is also shown in the drawings. The ends 16 of the strips 12 in the preferred embodiment have a rounded shape to make them comfortable to bite.

CONCLUSIONS, RAMIFICATIONS, AND SCOPE

The present invention is a new and useful toy for pets that accommodates a wide range of play patterns.

The specificities contained in the above descriptions should not be construed as limiting the overall scope invention. The embodiments described and shown herein are only intended as illustrations and examples. The range of possible embodiments is broader than may be practically shown in this document. Without changing the nature and scope of the invention, the toy may have more than three strips; the strips, ends, or junction may vary in shape; and the materials used may vary. Therefore the scope of the invention should be judged by the appended claims and their legal equivalents rather than by the examples given.

I claim:

1. A toy for pets comprising 1. a plurality of strips terminating in ends that can be easily bitten by the mouth of a pet
    a) said strips being connected to a common junction
    b) said strips extending from said junction in alternately opposing directions
    c) said strips having some space between them
    d) all said strips being coiled about a common circular path
    e) said circular path being in the form of a complete circle so that the toy is capable of rolling freely
    f) the coil formed by said strips having a circular opening into which the pet may insert a paw.

* * * * *